United States Patent
Choi et al.

(10) Patent No.: US 11,367,894 B2
(45) Date of Patent: Jun. 21, 2022

(54) LITHIUM METAL SECONDARY BATTERY INCLUDING LITHIUM METAL FOIL NEGATIVE ELECTRODE WITH NANO IMPRINT PATTERN STRUCTURE ADHERED TO SEPARATOR, AND METHOD OF MANUFACTURING THE SAME

(71) Applicant: LG Chem, Ltd., Seoul (KR)

(72) Inventors: Baeck-Boem Choi, Daejeon (KR); Cha-Hun Ku, Daejeon (KR); Min-Wook Kim, Daejeon (KR); Sang-Kyun Lee, Daejeon (KR)

(73) Assignee: LG Energy Solution, Ltd.

( * ) Notice: Subject to any disclaimer, the term of this patent is extended or adjusted under 35 U.S.C. 154(b) by 227 days.

(21) Appl. No.: 16/616,201

(22) PCT Filed: Dec. 21, 2018

(86) PCT No.: PCT/KR2018/016540
§ 371 (c)(1),
(2) Date: Nov. 22, 2019

(87) PCT Pub. No.: WO2019/132460
PCT Pub. Date: Jul. 4, 2019

(65) Prior Publication Data
US 2020/0091550 A1 Mar. 19, 2020

(30) Foreign Application Priority Data
Dec. 27, 2017 (KR) .................. 10-2017-0180546
Dec. 17, 2018 (KR) .................. 10-2018-0163554

(51) Int. Cl.
*H01M 10/0525* (2010.01)
*H01M 4/38* (2006.01)
(Continued)

(52) U.S. Cl.
CPC ....... *H01M 10/0525* (2013.01); *H01M 4/382* (2013.01); *H01M 10/0468* (2013.01); *H01M 2004/027* (2013.01)

(58) Field of Classification Search
CPC ............. H01M 4/382; H01M 10/0525; H01M 10/0468
(Continued)

(56) References Cited

U.S. PATENT DOCUMENTS 5,436,091 A 7/1995 Shackle et al.
5,981,107 A 11/1999 Hamano et al.
(Continued)

FOREIGN PATENT DOCUMENTS

CN 104137313 A 11/2014
JP H06140028 A 5/1994
(Continued)

OTHER PUBLICATIONS

Ryou et al., Mechanical Surface Modification of Lithium Metal: Towards Improved Li Metal Anode Performance by Directed Li Plating, 2015, Advanced Functional Materials, 834-841 (Year: 2015).*

(Continued)

*Primary Examiner* — Sean P Cullen
(74) *Attorney, Agent, or Firm* — Lerner, David, Littenberg, Krumholz & Mentlik, LLP

(57) ABSTRACT

Provided is a lithium metal secondary battery ensuring electrode-separator adhesive strength and a method for fabricating the same. The lithium metal secondary battery according to the present disclosure includes a negative electrode, a separator and a positive electrode, the negative electrode including a lithium metal foil as a negative electrode material, wherein a nano imprint pattern structure is formed on a lithium metal foil surface which is a surface of (Continued)

the negative electrode facing the separator, and the negative electrode and the separator are adhered to each other.

10 Claims, 12 Drawing Sheets

(51) Int. Cl.
    *H01M 10/04*     (2006.01)
    *H01M 4/02*     (2006.01)

(58) Field of Classification Search
    USPC .................................................. 429/231.95
    See application file for complete search history.

(56) References Cited

U.S. PATENT DOCUMENTS

| | | | | |
|---|---|---|---|---|
| 6,001,139 | A | * | 12/1999 | Asanuma ............ H01M 4/139 29/623.3 |
| 6,706,447 | B2 | | 3/2004 | Gao et al. |
| 2014/0349170 | A1 | | 11/2014 | Kim et al. |
| 2017/0222278 | A1 | | 8/2017 | Kwon et al. |

FOREIGN PATENT DOCUMENTS

| | | | | |
|---|---|---|---|---|
| JP | H10172537 | A | | 6/1998 |
| JP | 2011124028 | A | | 6/2011 |
| KR | 20030051141 | A | | 6/2003 |
| KR | 20070056783 | A | | 6/2007 |
| KR | 20130116828 | A | | 10/2013 |
| KR | 20130122578 | A | * | 11/2013 |
| KR | 20140099709 | A | | 8/2014 |
| KR | 20160028730 | A | | 3/2016 |
| KR | 20160051609 | A | | 5/2016 |
| KR | 20160051660 | A | | 5/2016 |
| KR | 20170014216 | A | * | 2/2017 |
| KR | 20170064207 | A | * | 6/2017 |
| KR | 20170091994 | A | | 8/2017 |
| KR | 101785638 | B1 | | 10/2017 |
| KR | 101785638 | B1 | * | 10/2017 |

OTHER PUBLICATIONS

Park et al., Micro-Patterned Lithium Metal Anodes with Suppressed Dendrite Formation for Post Lithium-Ion Batteries, 2016, Advanced Materials Interfaces, 3, 1600140 (Year: 2016).*
International Search Report for Appl. No. PCT/KR2018/016540 dated Apr. 19, 2019.
Park J. et al., "Micro-Patterned Lithium Metal Anodes with Suppressed Dendrite Formation for Post Lithium-Ion Batteries", Advanced Materials Interfaces, Jun. 2016, vol. 3, Issue 11, p. 1600140 (9 pages), wileyonlinelibrary.com.
Ryou M. et al., "Mechanical Surface Modification of Lithium Metal: Towards Improved Li Metal Anode Performance by Directed Li Plating", Advanced Materials Interfaces, Feb. 2015, vol. 25, Issue 6, p. 834-841, wileyonlinelibrary.com.
Search Report dated Mar. 25, 2022 from the Office Action for Chinese Application No. 201880030521.8 dated Apr. 1, 2022, 3 pages. [See p. 2, categorizing the cited references].

* cited by examiner (a)          (b)

LITHIUM METAL SECONDARY BATTERY INCLUDING LITHIUM METAL FOIL NEGATIVE ELECTRODE WITH NANO IMPRINT PATTERN STRUCTURE ADHERED TO SEPARATOR, AND METHOD OF MANUFACTURING THE SAME

CROSS-REFERENCE TO RELATED APPLICATIONS

The present application is a national phase entry under 35 U.S.C. § 371 of International Application No. PCT/KR2018/016540, filed Dec. 21, 2018, which claims priority from Korean Patent Application No. 10-2017-0180546 filed Dec. 27, 2017 and Korean Patent Application No. 10-2018-0163554, filed Dec. 17, 2018, the disclosures of which are incorporated herein by reference.

TECHNICAL FIELD

The present disclosure relates to a lithium metal secondary battery using a lithium (Li) metal as a negative electrode material without a separate negative electrode active material and a method for fabrication the same.

BACKGROUND ART

Secondary batteries can be recharged repeatedly, and they are gaining attention as an alternative to fuel energy. They have been primarily used in traditional handheld devices such as mobile phones, video cameras and electric power tools. Recently, the range of applications tends to gradually extend to electric vehicles (EVs, HEVs, PHEVs), large-capacity energy storage systems (ESSs) and uninterruptible power systems (UPSs).

A secondary battery includes an electrode assembly including a positive electrode, a negative electrode and a separator interposed between, and an electrolyte that electrochemically reacts with active materials coated on the positive electrode and the negative electrode, and a typical secondary battery is a lithium ion secondary battery in which electrochemical reactions occur in the positive electrode and the negative electrode by the action of lithium ions as working ions during charging and discharging. The conventional lithium ion secondary battery applies lamination in the assembly process to achieve the adhesive strength between the electrode and the separator within the electrode assembly. The lamination is a process that thermally joins the separator and the electrode. The lamination adheres the separator and the electrode stacked one on the other by heat, and as a result, increases the adhesive strength between the separator and the electrode. The rough surface shape of the conventional electrode including an active material, a conductive material and a binder makes it easy to form an electrode-separator adhesion through lamination with the separator.

Recently, in an effort to improve the energy density of lithium ion secondary batteries, a great attention is paid to the need for development of next-generation secondary batteries directly using a lithium metal foil as a negative electrode material without a separate negative electrode active material. A lithium metal has a high ionization tendency and low density as well as very low standard electrode potential and very high specific capacity. Although a lithium metal has problems such as the internal short of a battery caused by lithium dendrite growth and a risk that explosion may occur due to the exposure to moisture, if the problems are solved, the highest energy density can be achieved, and because of this advantage, a lithium metal is worth further research.

However, when a lithium metal foil with a flat and smooth surface is used as the negative electrode and forms an adhesive interface with the separator, it is impossible to expect a physical adhesion by the shape deformation of (the binder in) the separator that has been achieved through the rough active material surface shape of the conventional lithium ion secondary battery, and only a chemical adhesion by electrostatic attraction might be relied on. Accordingly, a lower adhesion than the electrode-separator adhesive strength achieved in the conventional lithium ion secondary battery may be formed in the assembly process of lithium-sulfur batteries, lithium-air batteries and all solid state batteries to which a lithium metal foil may be applied. This limits the assembly processability of next-generation secondary batteries, causing defects such as separation and meander tolerance.

FIG. 1 is a diagram illustrating a problem when a lithium metal foil with a flat and smooth surface is used as a negative electrode and adhered to a separator.

As shown in (a) of FIG. 1, assume that a lithium metal foil negative electrode 1 with a flat and smooth surface, a separator 2 and a positive electrode 3 are stacked and laminated to form a monocell 4 as shown in (b). Generally, the positive electrode 3 including a PVDF based binder and an active material of metal oxide having a high elastic modulus forms a stronger interfacial adhesion with the separator 2 than the lithium metal foil negative electrode 1 with a flat and smooth surface. By this reason, a defect such as bending occurs in the monocell 4 due to an adhesive strength difference between negative and positive electrodes as shown in (c). In case that there is a great difference in the extent of adhesion with the separator between the negative electrode and the positive electrode, if the monocell 4 bends too much due to a property difference between negative and positive electrodes after lamination, there is a very high likelihood that the lithium metal foil negative electrode 1 with a flat and smooth surface having a low adhesive strength will be separated as shown in (d).

Meanwhile, in the case of all solid state batteries, in some cases, the lamination pressure is applied to achieve adhesion of electrode-separator (electrolyte layer) of a unit cell. Due to the stiff (high elasticity) active material, the soft separator (electrolyte layer) may be partially damaged, causing a short. To solve this problem, Patent Literature 1 proposes the design of the electrode having a lower active material composition toward the interface of the separator (electrolyte layer) to prevent electrical shorting of the separator (electrolyte layer) even though strong lamination pressure is applied. However, this approach is difficult to technically implement and has low economic efficiency, and besides, cannot be applied to lithium metal all solid state batteries using no negative electrode active material.

RELATED LITERATURES

Patent Literatures (Patent Literature 1) JP2011-124028 A

DISCLOSURE

Technical Problem

The present disclosure is directed to providing a lithium metal secondary battery ensuring electrode-separator adhesive strength.

The present disclosure is further directed to providing a method for fabricating a lithium metal secondary battery ensuring electrode-separator adhesive strength.

Technical Solution

To achieve the above-described object, a lithium metal secondary battery according to the present disclosure includes a negative electrode, a separator and a positive electrode, the negative electrode including a lithium metal foil as a negative electrode material, wherein a nano imprint pattern structure is formed on a lithium metal foil surface which is a surface of the negative electrode facing the separator, and the negative electrode and the separator are adhered to each other.

Here, preferably, the separator is filled in the pattern structure to form a physical bond between the negative electrode and the separator.

In this instance, the physical bond may be formed when the separator is filled in the pattern structure by deformation, and may be formed when a separator binder applied to a surface of the separator is filled in the pattern structure.

Preferably, the lithium metal foil is 20~40 μm thick, and the surface pattern structure is 50~500 nm high.

Preferably, an adhesive strength between the negative electrode and the separator may be 3 times or more than that of the conventional art under a same lamination load used.

To achieve another object, a method for fabricating a lithium metal secondary battery according to the present disclosure includes stacking and laminating a negative electrode, a separator and a positive electrode, the negative electrode including a lithium metal foil as a negative electrode material, wherein a nano imprint pattern structure is formed on a lithium metal foil surface which is a surface of the negative electrode facing the separator, and adhering the negative electrode and the separator.

Adhesion of the negative electrode and the separator may be formed in the lamination, or may be formed by first laminating the negative electrode and the separator to manufacture a negative electrode-separator adhesion structure, or manufacturing the negative electrode-separator adhesion structure, then laminating the positive electrode, and a lamination load may be 10 kgf.

Forming the pattern structure includes directly applying the pressure to the lithium metal foil surface using a pattern mold. Preferably, the pattern mold may form a nano pattern having a height of 50~500 nm. Accordingly, preferably, an organic mold manufactured by replicating the pattern mold manufactured by a bottom-up method such as self assembly is used.

Preferably, a distance between patterns in the pattern structure is not greater than 1.60 μm.

The lithium metal secondary battery according to the present disclosure may have, as a unit cell, a monocell and a bicell manufactured through the lamination, and may be implemented as a stack cell by stacking the unit cells, folding the unit cells in zigzag, and stacking and folding the unit cells.

Advantageous Effects

According to the present disclosure, when the negative electrode includes a lithium metal foil as the negative electrode material, a physical bond is formed between the negative electrode and the separator by shape deformation of the separator, ensuring a close adhesion between the negative electrode and the separator. With the improved interfacial adhesion between the negative electrode and the separator, it is possible to avoid stress that may occur in the negative/positive electrode, thereby preventing the bending of the unit cell and the negative electrode separation. The lithium metal foil having the surface pattern structure forms a strong adhesion with the separator by physical adhesion in the lamination process, thereby improving the assembly processability.

The lithium metal secondary battery according to the present disclosure may have a monocell and a bicell as the unit cell, and may be implemented by stacking the unit cells, folding the unit cells in zigzag, and stacking and folding the unit cells. It is possible to fabricate various types of secondary batteries irrespective of the type of unit cell, and the improved negative electrode-separator adhesive strength leads to significant improvement in the properties of both the unit cell and the stack cell.

BRIEF DESCRIPTION OF THE DRAWINGS

The accompanying drawings illustrate the embodiments of the present disclosure, and together with the following detailed description, serve to provide a further understanding of the technical aspects of the present disclosure, and thus, the present disclosure should not be construed as limited to the drawings.

MODE FOR CARRYING OUT THE INVENTION

Figure 1:
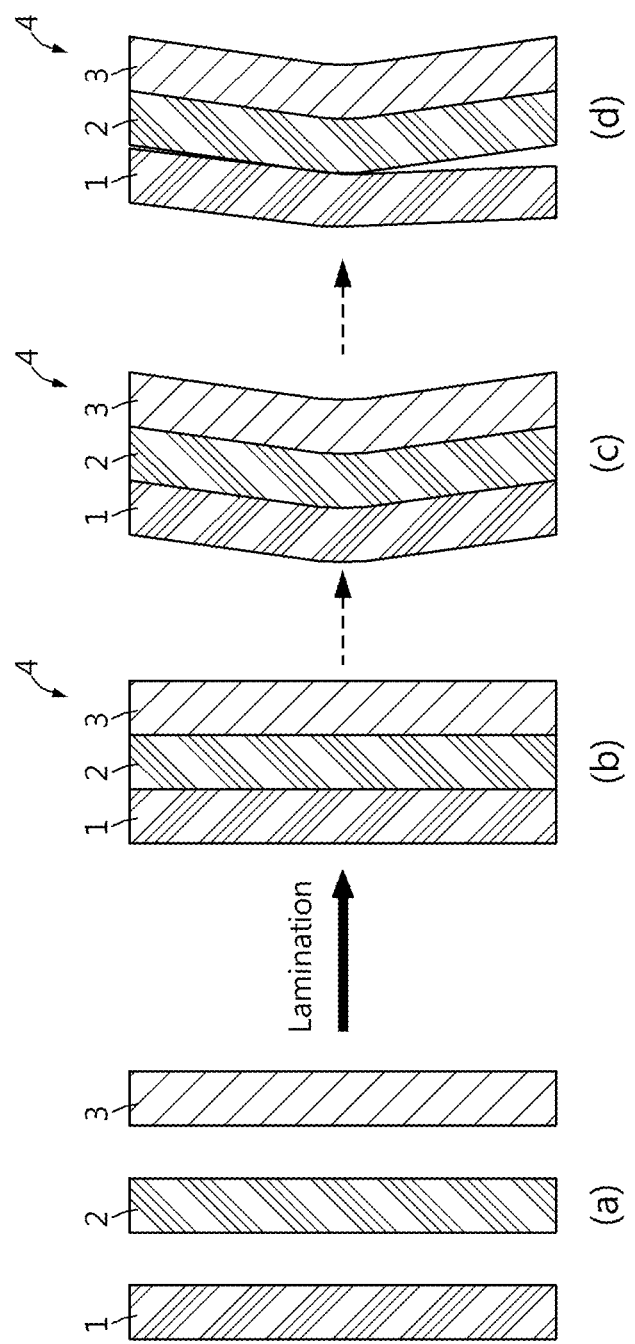
FIG. 1 is a diagram illustrating a problem when a lithium metal foil with a flat and smooth surface is used as a negative electrode and adhered to a separator.

Hereinafter, the embodiments of the present disclosure will be described with reference to the accompanying drawings. Prior to the description, it should be understood that the terms or words used in the specification and the appended claims should not be construed as limited to general and dictionary meanings, but interpreted based on the meanings and concepts corresponding to the technical aspects of the present disclosure on the basis of the principle that the inventor is allowed to define the terms appropriately for the best explanation. Therefore, the embodiments described herein and illustrations shown in the drawings are just an embodiment of the present disclosure, but not intended to fully describe the technical aspects of the present disclosure, so it should be understood that a variety of other equivalents and modifications could be made thereto at the time the invention was made.

In the embodiment described below, it should be interpreted as that even though the name changes depending on the type of electrolyte or separator used in a lithium metal secondary battery, the type of packaging used to package the lithium metal secondary battery and the internal or external structure of the lithium metal secondary battery, the lithium metal secondary battery covers any battery using a lithium ion as a working ion and including a lithium metal foil as a negative electrode material.

Additionally, the lithium metal secondary battery is not limited to the number of components. Accordingly, the lithium metal secondary battery should be interpreted as including a unit cell including an assembly of positive electrode/separator/negative electrode and an electrolyte in a packaging material as well as an assembly of unit cells, a module including assemblies connected in series and/or in parallel, a pack including modules connected in series and/or in parallel, and a battery system including packs connected in series and/or in parallel.

The present disclosure proposes electrode-separator adhesion improvement using a surface pattern structure of the lithium metal foil. The nano imprint technique is used to form the surface pattern structure on the lithium metal foil. The surface pattern structure is formed by directly applying the pressure to the lithium metal foil surface using a pattern mold. The lithium metal foil having the surface pattern structure forms an adhesion with the separator by physical adhesion in the lamination process, thereby improving the assembly process ability.

When the lithium metal foil is used as the negative electrode material, a lower interfacial adhesion with the separator may be formed than the positive electrode using a positive electrode active material. To solve this problem, after extensive studies for improving adhesion by applying a separator binder to the lithium metal foil surface or the separator surface, performing corona, RIE and acid treatment on the lithium metal foil surface or the separator surface to improve the electric charge properties and designing the surface roughness of the lithium metal foil surface or the separator surface to improve physical adhesion (anchoring), the inventors verify the effect of the nano imprint pattern structure formed on the lithium metal foil surface and propose the present disclosure.

The present disclosure relates to a lithium metal secondary battery. The lithium metal secondary battery of the present disclosure includes a lithium metal foil as a negative electrode material, and is the same as a general lithium metal secondary battery in terms of including a negative electrode having a negative electrode material, a separator and a positive electrode and its fabrication method. However, the lithium metal secondary battery of the present disclosure and the conventional lithium metal secondary battery have different surface shapes of the negative electrode material, and lamination is different from that of the conventional method for fabricating a lithium metal secondary battery.

Figure 2:
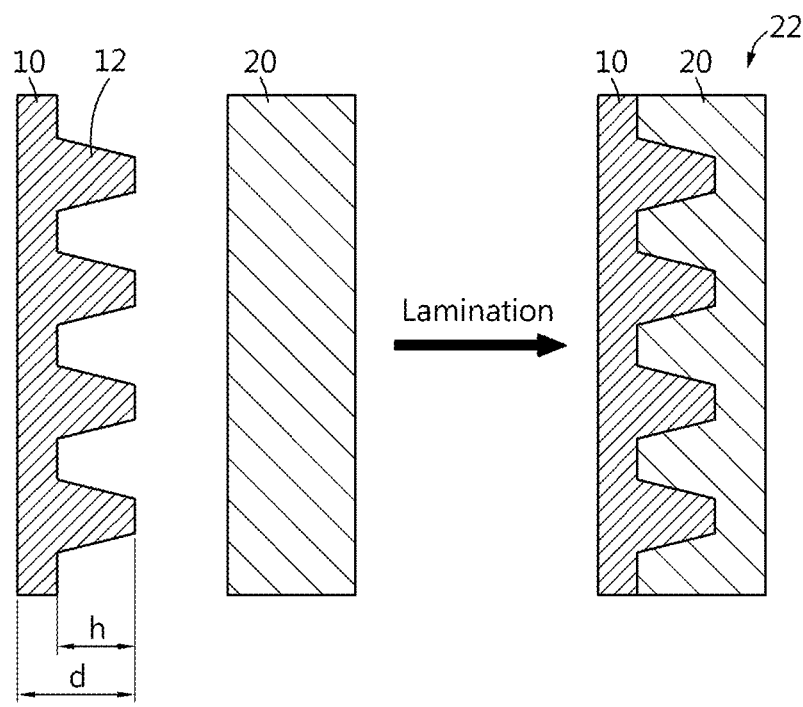
FIG. 2 shows a lithium metal foil negative electrode-separator adhesion structure included in a lithium metal secondary battery according to the present disclosure.
Figure 3:
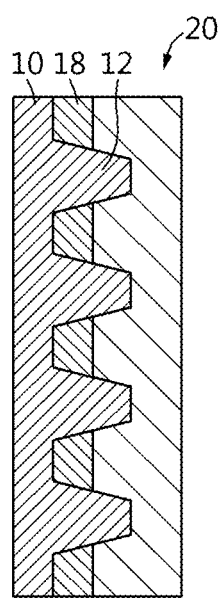
FIG. 3 shows another example of a lithium metal foil negative electrode-separator adhesion structure included in a lithium metal secondary battery according to the present disclosure.

FIG. 2 shows the lithium metal foil negative electrode-separator adhesion structure included in the lithium metal secondary battery according to the present disclosure. FIG. 3 shows another example of the lithium metal foil negative electrode-separator adhesion structure included in the lithium metal secondary battery according to the present disclosure. First, as shown in (a) of FIG. 2, a lithium metal foil negative electrode 10 having a surface pattern structure 12 and a separator 20 are prepared and laminated to manufacture a lithium metal foil negative electrode-separator adhesion structure 22 as shown in (b), and a positive electrode is laminated together to manufacture an electrode assembly which is then put in a packaging material such as a pouch case, followed by electrolyte solution injection and sealing to manufacture a lithium metal secondary battery. The lithium metal secondary battery has the pattern structure on the lithium metal foil surface that is a surface of the negative electrode 10 facing the separator 20, and has adhesion between the negative electrode 10 and the separator 20.

The nano imprint technique is applied to form the surface pattern structure 12 on the lithium metal foil. The surface pattern structure 12 is formed by directly applying the pressure to the lithium metal foil surface using a pattern mold. When the separator 20 is adhered to the lithium metal foil negative electrode 10 having the surface pattern structure 12, the separator 20 is filled into the surface pattern structure 12 by shape deformation. Accordingly, adhesion is formed between the negative electrode 10 and the separator 20 by physical bond in the lamination process, thereby improving the assembly processability.

In this instance, the physical bond may be formed when the separator 20 is filled into the surface pattern structure 12 by deformation, and as shown in FIG. 3, the physical bond may be formed when a separator binder layer 18 applied to the separator 20 surface is filled into the surface pattern structure 12. In this instance, the separator binder layer 18 may be filled into the surface pattern structure 12 in part, or may form a conformal layer on the surface of the surface pattern structure 12, or may be only present on the highest protrusion area of the surface pattern structure 12.

Preferably, there is no gap between the separator 20 and the lithium metal foil negative electrode 10, and when the separator binder layer 18 exists, there is no gap between the separator 20, the separator binder layer 18 and the lithium metal foil negative electrode 10.

The separator 20 may be a polyolefin based polymer such as PE and PP, and the separator binder layer 18 may be a PVDF based binder additionally formed and provided on the separator 20.

As described below, a method for forming the surface pattern on the lithium metal foil negative electrode 10 may be an imprint method using the pressure, such as nano imprint. In this instance, the lithium metal is pressed down when subjected to the pressure, and the modulus and density of the material increase and the lithium metal becomes rigid. When a relatively soft separator binder layer 18 contrary to the rigid lithium metal is further included, a better adhesive interface may be formed. Referring back to FIG. 2, when the lithium metal foil is used as the negative electrode material, the present disclosure uses the lithium metal foil roll-pressed to the thickness d of 100 µm or less to achieve the energy density of the battery. The thickness d is calculated by an average distance between two outermost surfaces of the lithium metal foil. The lithium metal foil used as the negative electrode material may or may not include a current collector. When the lithium metal foil includes a current collector, the lithium metal may be formed, for example, 10~100 μm thick on two surfaces of 5~20 μm thick copper foil current collector. When the lithium metal foil does not include a current collector, the lithium metal foil alone may be roll-pressed to 100 μm or less without a separate current collector. The height h of the surface pattern structure 12 is 1 μm or less. The height h corresponds to the height of a protrusion or the depth of a groove, and is calculated by a height average of the extent to which the surface pattern structure 12 protrudes or recedes from the lithium metal foil. The thickness of the lithium metal foil more than 100 μm is unstable for achieving high energy density due to the increases in thickness and volume in the manufacture of the stack cell. Preferably, the thickness ranges 20~40 μm. In this case, the height h of the surface pattern structure 12 is more preferably 50~1,000 nm. The thickness of the lithium metal foil less than 20 μm is difficult to handle and is problematic for structural rigidity. When the metal current collector (for example, a copper foil) is applied, the electrode may be manufactured by the roll-pressing adhesion of different types of metals between the lithium and the current collector, but when the lithium metal foil thinner than 20 μm is applied, there is concern about damage to the lithium metal when roll-pressing. Additionally, when the battery is manufactured using the lithium metal foil as the negative electrode, in the event of reversible thickness changes of the lithium metal during charging and discharging while in real use, if the thickness of the lithium metal is very small, the structural stability is not ensured. The thickness of the lithium metal foil more than 40 μm is undesirable from the viewpoint of energy density due to the increases in thickness and volume in the manufacture of the stack cell. The height of the surface pattern structure less than 50 nm is insufficient for a sufficient physical bond between the negative electrode and the separator. It is difficult to expect that the lithium metal having the surface pattern height less than 50 nm will form a physical adhesion (anchoring) by pressing with the separator binder layer formed on the separator fabric surface by agglomeration of separator binder particles having the size of a few tens or a few hundreds of nm. The height of the surface pattern structure more than 1,000 nm is undesirable because the separator binder layer on the separator surface cannot be densely filled in the surface pattern structure. When excessive pressing pressure, temperature and rate are applied to form a physical adhesion, wrinkling, cracking or separation may occur on the electrode surface. As described in the following experimental example, as a result of experiment in manufacturing a 120 nm high grating structure on the 40 μm thick roll-pressed lithium metal foil through DVD-R structure stimulation, it can be seen that adhesion is significantly improved without electrical charge surface treatment.

The pattern mold used for nano imprint to fabricate the lithium metal secondary battery according to the present disclosure has a raised part or sunken part having the height of 50~1,000 nm. The groove may be formed in a reverse shape of the raised part on the lithium metal foil surface by directly pressing the raised part onto the lithium metal foil, and the protrusion may be formed in a reverse shape of the sunken part on the lithium metal foil surface by pushing the lithium metal foil into the sunken part. The raised or sunken part may be in the shape of a pillar, a cone, etc., and preferably, has a tapered shape that becomes narrower upward the top of the raised part and downward the bottom of the sunken part because it is easy to insert the separator into the lithium metal foil surface structure to be formed later. Accordingly, the raised or sunken part of the pattern mold is preferably in the shape of a cone, and may have a shape of a triangular pyramid, a square/rectangular pyramid, a circular cone, etc., according to the manufacturing method.

Most preferably, the separator is densely filled in the lithium metal foil surface structure by shape deformation to form a perfectly close adhesion with no gap between the lithium metal foil and the separator. When the lithium metal foil surface structure is a raised part, the separator has a sunken part that fits into the raised part, obtaining an engaged cross-sectional structure as if they are engaged with each other at their corresponding locations, and likewise, when the lithium metal foil surface structure is a sunken part, the separator has a raised part that fits into the sunken part, obtaining an engaged cross-sectional structure as if they are engaged with each other at their corresponding locations. In particular, it should be noted that the lithium metal foil surface structure is intentionally formed by nano imprint, but shape deformation of the separator is accomplished by the lamination pressure. For a perfectly close adhesion, it is necessary to select a proper shape, height and lamination pressure (considering a lamination load, and an area on which the load acts) of the surface structure.

A master mold (a mother mold) of silicon or quartz manufactured by the etching technique, so-called top-down method commonly used to manufacture a pattern mold, or an organic mold manufactured by replicating the master mold may be only manufactured on a micro scale, and no matter how small the pattern is, the minimum pattern size (or height) is 10~15 μm, and such molds are unstable for implementing the present disclosure. The present disclosure proposes using an organic mold manufactured by replicating a pattern mold manufactured by the bottom-up method such as self assembly. In particular, it is desirable to use a soft mold by replication of a pattern mold manufactured by the bottom-up method using an organic matter of PDMS, ETPTA, polyurethane and PFPE. With the mold, the surface pattern structure having the height of 50~1,000 nm, i.e., a nano scale micro pattern, may be formed on the lithium metal foil.

For example, a method for forming the pattern mold having a triangular pyramid having the height of 50~1,000 nm is described as below.

1) A single layer of silica or polystyrene (PS) particles having the size of 1 μm or less is formed with a hexagonal closed pack array (HCP) structure on the surface of a substrate of glass, a polymer film or a metal foil by self assembly.

2) An organic mold is manufactured by PDMS, ETPTA, epoxy or PFPE replication using the HCP structure single layer surface as a master mold. After an organic matter is applied to the master mold and the substrate is removed, the silica or polystyrene particles may be removed (etched) to form a triangular pyramid nano pattern in relief or intaglio according to the surface properties (for example, surface energy) of the material of the organic mold used. Compared with the use of PDMS or low molecular weight ETPTA, the use of high molecular weight ETPTA or PFPE can manufacture a hard mold, and is suitable for nano imprint application.

3) Accordingly, the triangular pyramid nano pattern in different sizes may be formed in relief or intaglio using PFPE on the lithium metal foil surface by nano imprint. Preferably, the triangular pyramid nano pattern having the height of 50~1,000 nm is formed.

Meanwhile, the shape of the sunken part or raised part of the pattern mold is not necessarily limited to the example presented above. The pattern may include an island shaped pattern isolated in four directions from other pattern such as a cone or a pillar, and a line and space pattern having a repetition of stripe shaped patterns extending along a direction, spaced apart a predetermined distance from other pattern. For example, the pattern may have a repetition of ridges and furrows.

Figure 4:
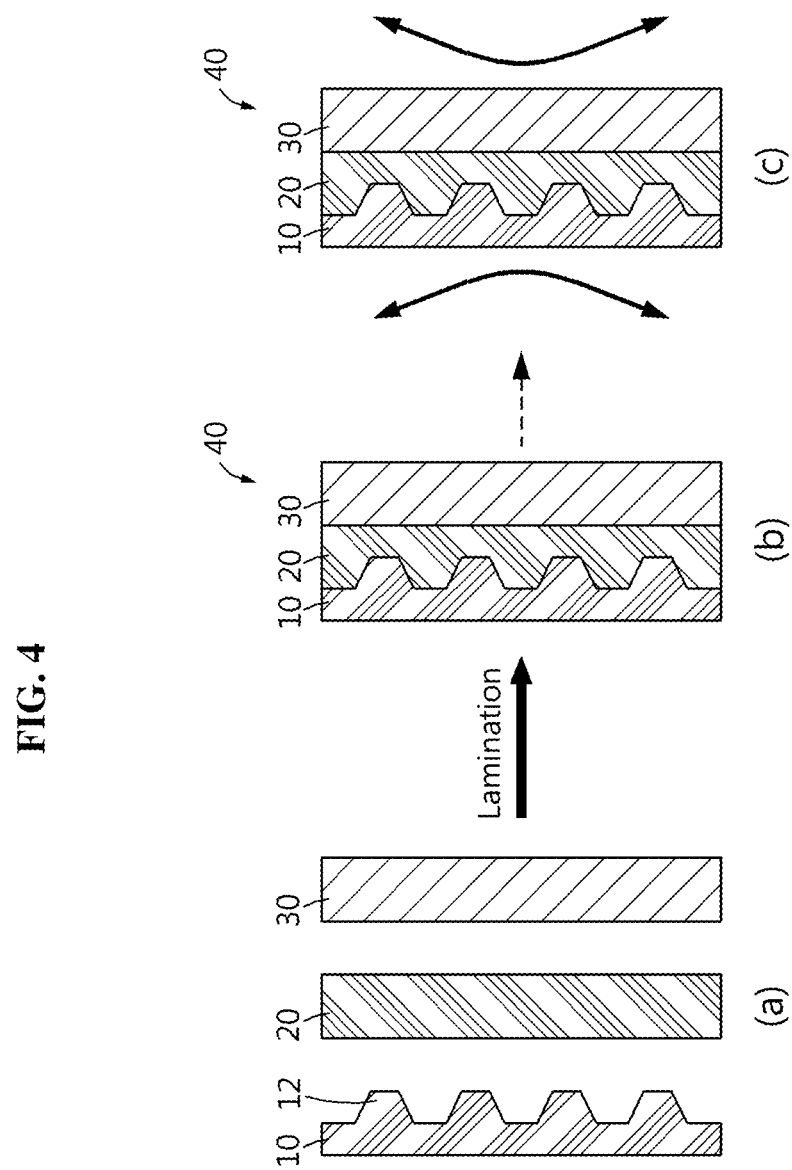
FIG. 4 is a diagram illustrating an improvement effect when a lithium metal foil having a surface pattern structure is used as a negative electrode and adhered to a separator according to the present disclosure.

FIG. 4 is a diagram illustrating an improvement effect when the lithium metal foil having the surface pattern structure according to the present disclosure is used as the negative electrode and adhered to the separator.

As shown in (a) of FIG. 4, the lithium metal foil negative electrode 10 having the surface pattern structure 12, the separator 20, the positive electrode 30 are stacked and laminated to form a monocell 40 as shown in (b). It is obvious that a separator binder may be applied to the separator 20 as auxiliary adhesion means.

The positive electrode 30 generally using a PVDF based binder and an active material of metal oxide having high elastic modulus forms a good interfacial adhesion with the separator 20. If the lithium metal foil with the flat and smooth surface is used as the negative electrode, adhesion with the separator will be poor. However, because the present disclosure uses the negative electrode 10 having the surface pattern structure 12 on the lithium metal foil surface, the separator itself and/or the separator binder is filled in the surface pattern structure 12, and the negative electrode 10 and the separator 20 are engaged with each other, and thus a interfacial adhesion between the negative electrode 10 and the separator 20 is physically improved. Accordingly, even if stress that may occur in the negative/positive electrode acts as indicated by the arrow (c), the stress cancels out, thereby preventing the bending of the monocell 40 and the negative electrode separation.

Experimental Example

To manufacture an experimental sample according to the present disclosure, pressing for nano imprint is performed on a lithium metal foil surface using DVD-R (LG Electronics, R4.7) as a template. As previously described, it is desirable to manufacture and use a pattern mold by the bottom-up method, but it can be seen that pattern transfer can be accomplished using readily available DVD-R as the pattern mold and its effect is demonstrated.

Figure 5:
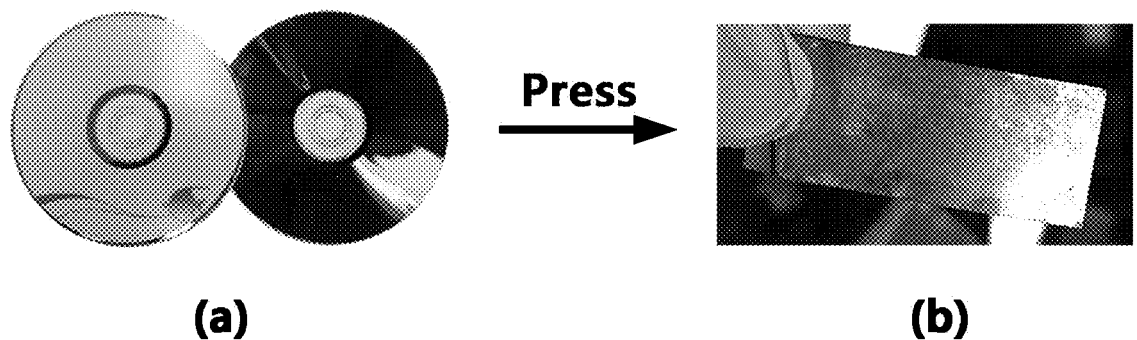
FIG. 5 is a photographic image of a process of preparing an experimental example sample according to the present disclosure.
Figure 6:
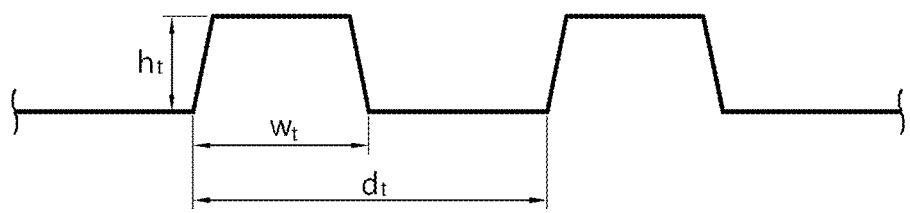
FIG. 6 is a cross-sectional view of DVD-R used for nano imprint.

FIG. 5 is a photographic image of a process of preparing an experimental example sample according to the present disclosure. FIG. 6 is a cross-sectional view of DVD-R used for nano imprint.

First, DVD-R (R4.7, LG Electronics) as shown in (a) of FIG. 5 is prepared and dismantled to remove an organic dye and an aluminum layer to prepare a polycarbonate having a grating structure (that will be used as a pattern mold). As shown in FIG. 6, DVD-R has the distance $d_t$ between track pitches of 740 nm, the track pitch height $h_t$ of 120 nm, and the track pitch width $w_t$ of 320 nm. Using the DVD-R as a template, pressing is performed for 1 min under the pressure of 300 kgf/cm² on the 40 μm thick roll-pressed lithium metal foil surface, and as shown in (b) of FIG. 5, a diffraction phenomenon of DVD-R surface is also observed on the lithium metal foil surface. This reveals that the grating structure (including ridges and furrows) of DVD-R is transferred onto the lithium metal foil surface to form a pattern on the lithium metal foil surface. Accordingly, it can be seen that when the pressure is directly applied to the lithium metal foil surface using the pattern mold as proposed by the present disclosure, the pattern of the pattern mold can be transferred onto the lithium metal foil surface.

Figure 7:
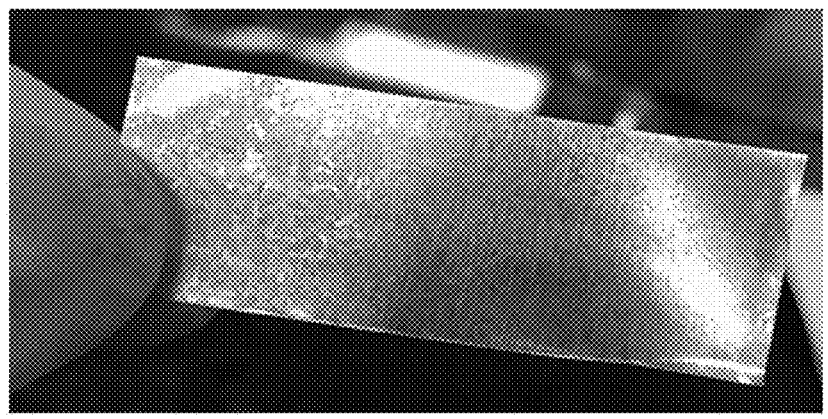
FIG. 7 is a photographic image of a general lithium metal foil with a flat and smooth surface as a comparative example.

FIG. 7 is a photographic image of a general lithium metal foil with a flat and smooth surface as a comparative example.

A lithium metal foil (the present disclosure experimental example) having a grating structure (120 nm height $h_t$) of optical disk (DVD-R) on the surface and a general lithium metal foil (comparative example) as shown in FIG. 7 are prepared, and each is laminated with a separator for a lithium ion secondary battery to manufacture an electrode-separator adhesion structure.

Each lithium metal foil is 15 mm wide and 50 mm long. For the lamination, roll-lamination is used, and 10 kgf load is applied at a rate of 300 mm/sec under 60° C. temperature condition. For the comparative example, the lamination load of 100 kgf and 250 kgf is prepared.

An adhesive strength comparison test is performed on the electrode-separator adhesion structure of the present disclosure experimental example and the comparative example. The adhesive strength is measured by the commonly used 90° peel-off test, and the rate is 100 mm/min.

Figure 8:
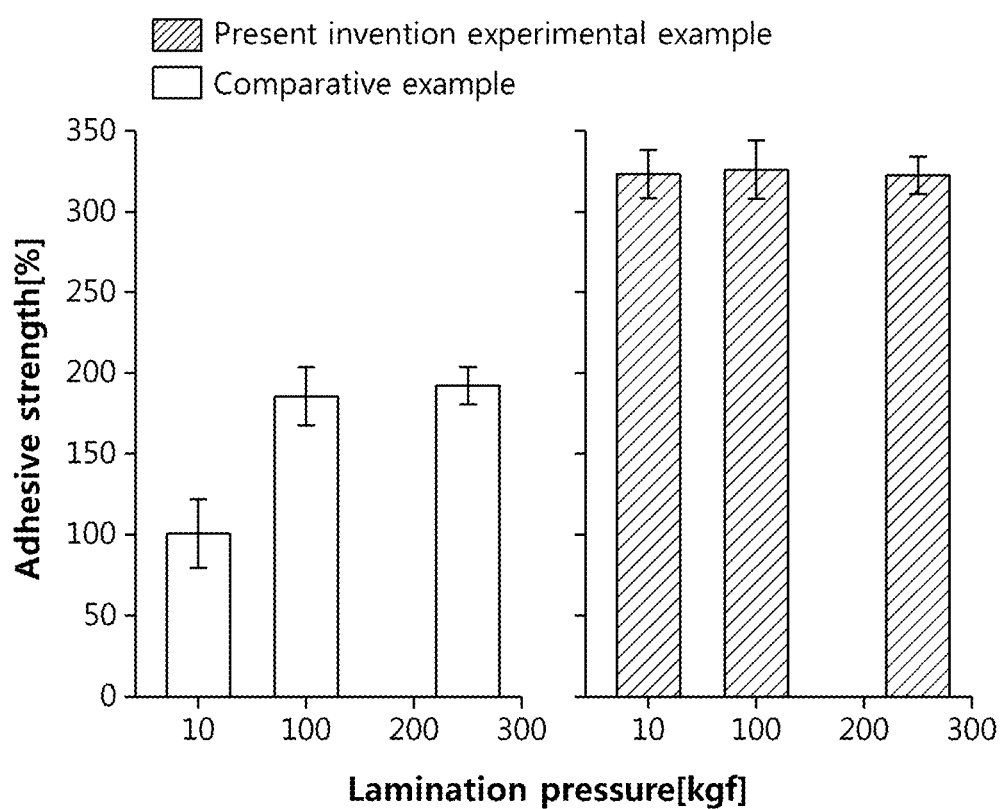
FIG. 8 is a graph showing 90° peel-off test results of an experimental example of the present disclosure and a comparative example.

FIG. 8 is a graph showing 90° peel-off test results of the present disclosure experimental example and the comparative example.

Referring to FIG. 8, when the comparative example at the lamination load of 10 kgf is designated as 100% adhesive strength, as the lamination load increases to 100 kgf and 250 kgf, the adhesive strength increases to 185% and 192%. In contrast, in the case of the present disclosure experimental example, 320% adhesive strength is achieved at the lamination load of 10 kgf. As described above, under the same lamination load, the present disclosure experimental example can have higher adhesive strength 3 times or more than the comparative example. The high adhesive strength cannot be achieved even if the lamination load of the comparative example increases 10 times and 25 times.

As described above, it can be seen that when the lithium metal foil having the nano imprint pattern structure on the surface according to the present disclosure experimental example has a higher adhesive strength with the separator than the general lithium metal foil used as the comparative example, and that it is possible to obtain a good adhesive strength outcome even under low lamination pressure.

Figure 9:
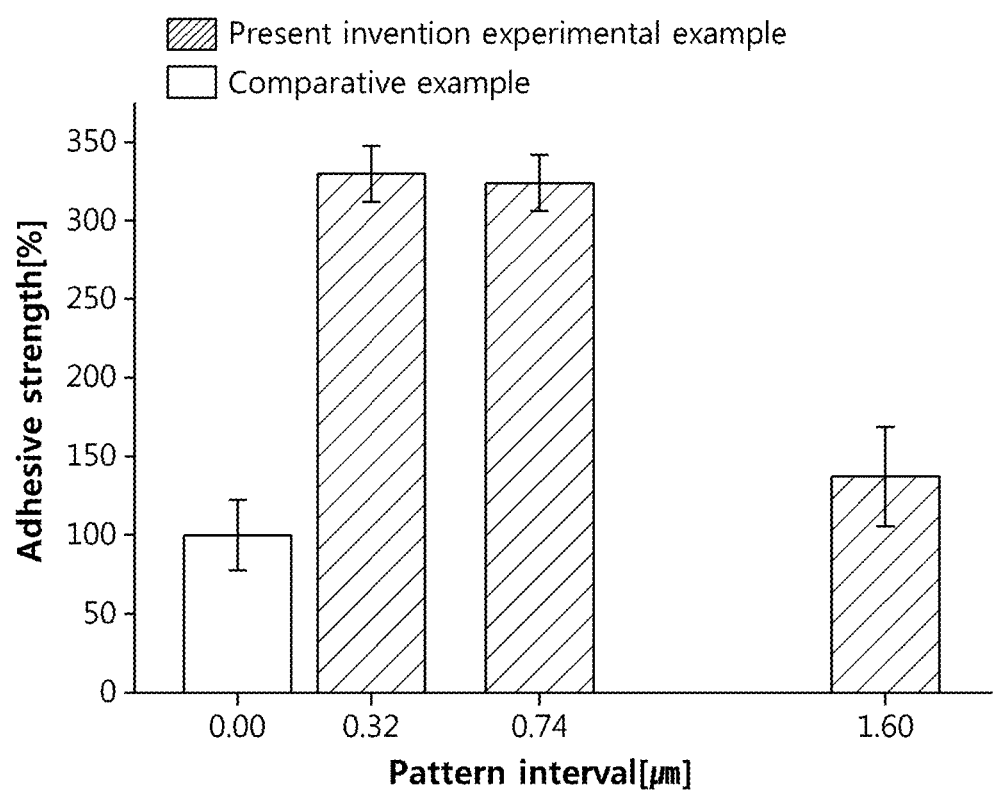
FIG. 9 is a graph showing 90° peel-off test results of another experimental example of the present disclosure and a comparative example.

FIG. 9 is a graph showing 90° peel-off test results of another experimental example of the present disclosure and a comparative example.

Sample manufacturing and testing methods are similar to those of the experimental example from which the graph of FIG. 8 is obtained.

This test evaluates a change in adhesive strength as a function of a pattern interval on the lithium metal foil surface. Here, the pattern interval is a distance between patterns, and also refers to the distance $d_t$ between track pitches as previously shown in FIG. 6.

The pattern interval is set to 0.00 μm, 0.32 μm, 0.74 μm, and 1.60 μm. The pattern interval of 0.00 μm indicates the lithium metal foil with no pattern, and may correspond to the comparative example showing the results of FIG. 8. The pattern interval of 0.32 μm indicates the lithium metal foil subjected to pattern transfer using Blu-ray Disk as a template. The pattern interval of 0.74 μm indicates the lithium metal foil subjected to pattern transfer using DVD-R as a template as shown in the experimental example of FIG. 8.

The greatest pattern interval of 1.60 μm indicates the lithium metal foil subjected to pattern transfer using CD-R as a template.

Each lithium metal foil is 15 mm wide and 50 mm long, for the lamination, roll-lamination is used, and 10 kgf load is applied at a rate of 300 mm/sec under 60° C. temperature condition.

An adhesive strength comparison test is performed on the electrode-separator adhesion structure of the present disclosure experimental example and the comparative example. The adhesive strength is measured by the commonly used 90° peel-off test and the rate is 100 mm/min.

Referring to FIG. 9, when the comparative example at the lamination load of 10 kgf is designated as 100% adhesive strength, the present disclosure experimental example having the pattern interval of 0.32 μm and 0.74 μm achieves 300% or more adhesive strength, and the adhesive strength improvement effect is obviously seen. It is found that the present disclosure experimental example having the pattern interval of 1.60 μm achieves about 150% adhesive strength, and has a higher adhesive strength than the comparative example.

After an electrode assembly including the electrode-separator adhesion structure is manufactured, the cell stiffness of a secondary battery including the electrode assembly is measured. There is no significant difference between the presence and absence of pattern. Also, there is no significant difference in pattern interval difference. This is because the cell stiffness is dominated by the stiffness of the positive electrode itself rather than the negative electrode lamination adhesive strength as expected.

It is determined whether or not there is a separator separation at the edge in the electrode-separator adhesion structure. In the case of the comparative example having the pattern interval of 0.00 μm, that is, having no pattern, edge separation is observed. The present disclosure experimental example having the pattern interval of 0.32 μm and 0.74 μm has no edge separation. Accordingly, it can be seen that when the pattern is formed on the lithium metal foil according to the present disclosure, the adhesive strength with the separator is higher and the prevention effect of separation at the edge is better. However, even though the lithium metal foil have the pattern, edge separation is observed in the sample having the pattern interval of 1.60 μm. Accordingly, in terms of preventing the edge separation, it is desirable that the pattern interval is not so great when forming the pattern on the lithium metal foil. For example, it is desirable that the pattern interval is not greater than 1.60 μm.

Hereinafter, a method for fabricating a lithium metal secondary battery according to the present disclosure will be described in detail with reference to FIG. 10 based on the above-described configuration.

Figure 10:
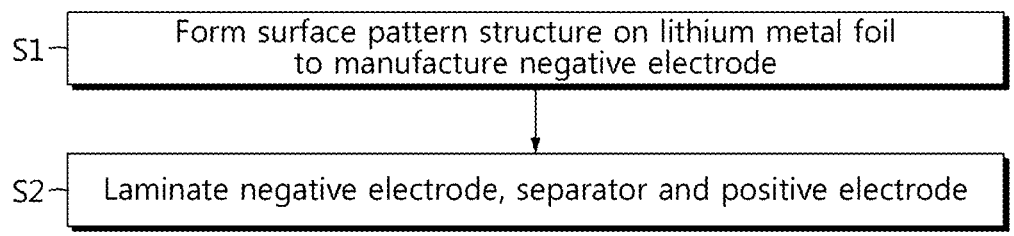
FIG. 10 is a flowchart showing a method for fabricating a lithium metal secondary battery according to an embodiment of the present disclosure.

FIG. 10 is a flowchart showing a method for fabricating a lithium metal secondary battery according to an embodiment of the present disclosure.

The method for fabricating a lithium metal secondary battery according to the present disclosure begins with preparing a lithium metal foil, and forming a nano imprint pattern structure on a surface facing a separator to manufacture a negative electrode (s1). In the case of a one-sided negative electrode, the surface pattern structure may be formed on one surface of the lithium metal foil, and in the case of a double-sided negative electrode, the surface pattern structure may be formed on two sides of the lithium metal foil. Two one-sided negative electrodes having the surface pattern structure on one side may be adhered and used as a double-sided negative electrode.

The pattern structure is formed by the nano imprint technique that directly applies the pressure to the surface of the lithium metal foil using a pattern mold as previously described. The conditions of the pattern mold for forming the surface pattern structure having the height of 50~1,000 nm, i.e., a nano scale micro pattern, are described above.

Subsequently, a separator and a positive electrode are stacked and laminated on the negative electrode prepared in s1 (s2).

In this instance, the negative electrode and the separator are first laminated to manufacture a negative electrode-separator adhesion structure, then the positive electrode is laminated together to form an assembly. The negative electrode, the separator and the positive electrode may be laminated together to form an assembly. In any case, the lamination load may be 10 kgf. As the shape of the separator is deformed by the lamination pressure, the separator is filled in the pattern structure to form a physical bond between the negative electrode and the separator.

In the above-described experiment results (FIG. 8), as a result of experiment in which the grating structure having the height $h_t$ of 120 nm is formed on the 40 μm thick roll-pressed lithium metal foil through DVD-R structure stimulation, it is found that adhesion is greatly increased without electric charge surface treatment, but if necessary, to further increase the adhesive strength, methods for improving adhesion may be also used by applying a separator binder to the lithium metal foil surface or the separator surface, and by improving the electric charge properties through corona, RIE and acid treatment on the lithium metal foil surface or separator surface.

Figure 11:
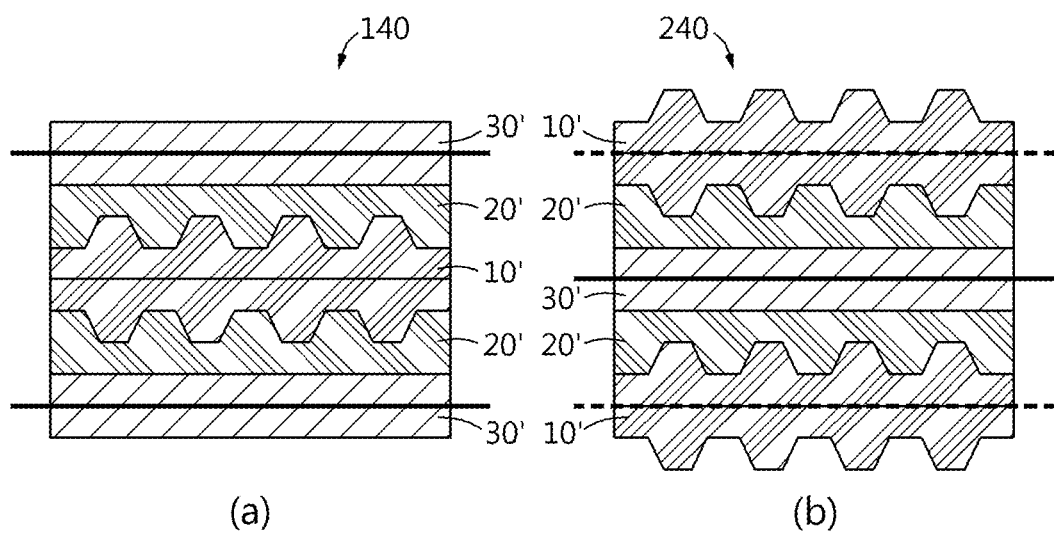
FIG. 11 is a diagram illustrating a lithium metal secondary battery according to another embodiment of the present disclosure.

The cell manufactured in this step may be the monocell 40 of negative electrode 10-separator 20-positive electrode 30 structure as shown in (b) of FIG. 4, the A type bicell 140 of positive electrode 30'-separator 20'-negative electrode 10'-separator 20'-positive electrode 30' structure as shown in (a) of FIG. 11, or the C type bicell 240 of negative electrode 10'-separator 20'-positive electrode 30'-separator 20'-negative electrode 10' structure as shown in (b) of FIG. 11. FIG. 11 shows an example in which the negative electrode 10' is a double-sided negative electrode, and the positive electrode 30' is a double-sided positive electrode.

When the pattern structure is formed on the surface of the lithium metal foil that will face the separator according to the present disclosure, it is possible to reduce the conditions for applying the lamination pressure. It is possible to ensure good negative electrode-separator adhesive strength under low pressure as described above with reference to the experiment results of FIG. 8.

The lithium metal secondary battery according to the present disclosure may have, as a unit cell, the monocell 40 and the bicell 140, 240 manufactured by the above-described method, and may be implemented as a stack cell by stacking the unit cells, folding the unit cell in a zigzag form, and stacking and folding the unit cells. According to the present disclosure, by virtue of the improved negative electrode-separator adhesive strength, it is possible to improve not only the properties of the unit cell itself but also the properties of the stack using the same.

Figure 12:
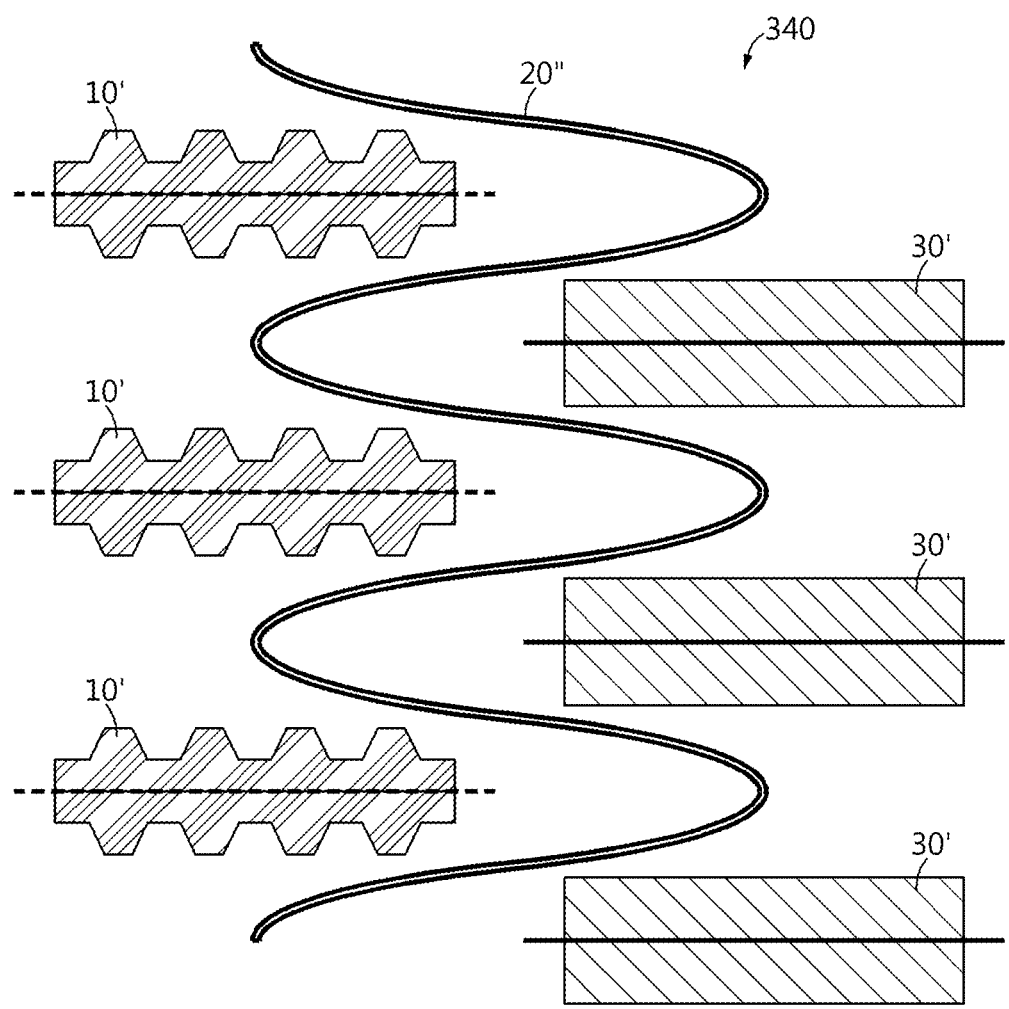
FIG. 12 is a diagram illustrating a lithium metal secondary battery according to still another embodiment of the present disclosure.

FIG. 12 is a diagram illustrating a lithium metal secondary battery according to still another embodiment of the present disclosure.

Referring to FIG. 12, a double-sided negative electrode 10' and a double-sided positive electrode 30' are prepared, and they are assembled with a folding separator 20" folded in zigzag to manufacture a zigzag folding cell 340. Generally, when zigzag folding is applied, separation that may occur between the negative electrode and the folding separator due to an adhesive strength difference between negative electrode and the positive electrode is more serious than the problem in the monocell described with reference to FIG. 1. According to the present disclosure, even though the lithium metal secondary battery is manufactured in a zigzag folding form, the improved negative electrode-separator adhesive strength lowers the separation likelihood, and significantly reduces the zigzag folding stack defects.

As described above, the present disclosure manufactures the negative electrode through a simultaneous nano pattern transfer process by pre-forming a pattern mold having nano scale protrusion and recess pattern, and pressing it onto the lithium metal foil surface. This can form the nano pattern in mass quickly, and is very suitable for mass production of lithium metal secondary batteries.

The surface pattern structure formed by transfer is only determined by the shape of the pattern mold, and thus there is no other unexpectable process variable. The bottom-up method can form a very fine surface pattern structure having the height of 50~1,000 nm, and thus a small thickness of 40 μm or less is desirable in terms of energy density to simultaneously transfer the pattern onto the lithium metal foil on a suitable scale. Additionally, basically, the pressing technique is used, and can be implemented by a very low-priced apparatus.

Meanwhile, in the battery process, the application of pressure is necessary in a chronological order in ① the electrode roll-press (in the present disclosure, the lithium metal foil is made 20~40 μm thick) before manufacturing a unit cell, ② the unit cell assembly process ((a) and (b) of FIG. 4, and s2 in FIG. 10), ③ the stack cell assembly process (for example, FIG. 11), and ④ the jig formation (J/F) activation process before releasing a final product.

As opposed to the present disclosure, if a lithium metal foil with a flat and smooth surface is used, to achieve the unit cell/stack cell properties, it is necessary to strongly apply the pressure in the steps ② and ③. There is no concern about defects that may occur in the manufactured electrode or separator (in the case of an all solid state battery, the electrolyte layer) such as cracking, tearing, warpage and waviness. However, according to the present disclosure, it is possible to form a high electrode-separator (electrolyte layer) adhesive interface through the application of low pressure in the steps of ② and ③. Accordingly, it is possible to reduce defects that may occur due to the application of high pressure.

The method according to the present disclosure is easier and more economically efficient than technology designed to reduce the active material composition in the electrode as mentioned in the related art. Additionally, the method according to the present disclosure may additionally have advantages as below.

The pressure application in the steps ①, ② and ③ cannot be omitted, but only the minimum pressure necessary for the process (to prevent the electrode-separator separation and meander tolerance) may be applied. This can make it easy to ④ remove gas produced in the J/F activation process.

Meanwhile, if a very high pressure, temperature and rate is applied to ensure the properties of the unit cell in the assembly process, a close adhesion will be formed between the electrode and the separator by the shape change of the polymer binder such as PVDF, and a strong electrode-separator adhesive strength will be achieved. However, this increases the necessary time for the electrolyte filling during the pre-aging period before the activation process after the assembly process, resulting in the increased process cost. According to the present disclosure, the electrode-separator adhesive strength increases by the application of the minimum pressure without excessive pressure, thereby facilitating the electrolyte filling in the pre-aging after injection.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

What is claimed is:

1. A lithium metal secondary battery, comprising:
a negative electrode, a separator, a separator binder layer disposed on a surface of the separator, and a positive electrode, the negative electrode including a lithium metal foil as a negative electrode material,
wherein the lithium metal foil comprises a nano imprint pattern structure formed on a lithium metal foil surface which is a surface of the negative electrode facing the separator and the separator binder layer, the negative electrode and the separator are adhered to each other, and
the separator binder layer is filled in the nano imprint pattern structure.

2. The lithium metal secondary battery according to claim 1, wherein the lithium metal foil has a thickness within the range of 20 μm to 40 μm, and the nano imprint pattern structure has a height of 50 nm to 500 nm.

3. The lithium metal secondary battery according to claim 1, wherein the separator is filled in the nano imprint pattern structure such that there is a physical bond between the negative electrode and the separator.

4. The lithium metal secondary battery according to claim 3, wherein the physical bond is a result of the separator being filled in the nano imprint pattern structure by deformation.

5. The lithium metal secondary battery according to claim 3, wherein the physical bond is a result of a separator binder applied to a surface of the separator being filled in the nano imprint pattern structure.

6. A method for fabricating a lithium metal secondary battery, comprising:
stacking and laminating a negative electrode, a separator and a positive electrode, the negative electrode including a lithium metal foil for a negative electrode material, wherein a nano imprint pattern structure is formed on a lithium metal foil surface which is a surface of the negative electrode facing the separator; and
adhering the negative electrode and the separator,
wherein in the adhering, the separator is filled in the nano imprint pattern structure to form a physical bond between the negative electrode and the separator and the physical bond is formed when a separator binder layer applied to a surface of the separator is filled in the nano imprint pattern structure.

7. The method for fabricating a lithium metal secondary battery according to claim 6, wherein the physical bond is formed when the separator is filled in the nano imprint pattern structure by deformation.

8. The method for fabricating a lithium metal secondary battery according to claim 6, wherein forming the nano imprint pattern structure comprises directly applying pressure to the lithium metal foil surface using a pattern mold.

9. The method for fabricating a lithium metal secondary battery according to claim 6, wherein a distance between patterns in the nano imprint pattern structure is not greater than 1.60 μm.

10. The method for fabricating a lithium metal secondary battery according to claim 6, wherein:
- adhesion of the negative electrode and the separator is formed in the lamination, or
- adhesion of the negative electrode and the separator is formed by first laminating the negative electrode and the separator to manufacture a negative electrode-separator adhesion structure, or
- adhesion of the negative electrode and the separator is formed by manufacturing the negative electrode-separator adhesion structure, then laminating the positive electrode, and a lamination load is 10 kgf.

* * * * *